April 29, 1924.
H. LÖWY
1,492,300
MEANS FOR ELECTRO AVIATIC PROOF AND MEASURING OF THE DISTANCE OF ELECTRIC CONDUCTIVE BODIES
Filed July 17, 1923   2 Sheets-Sheet 1
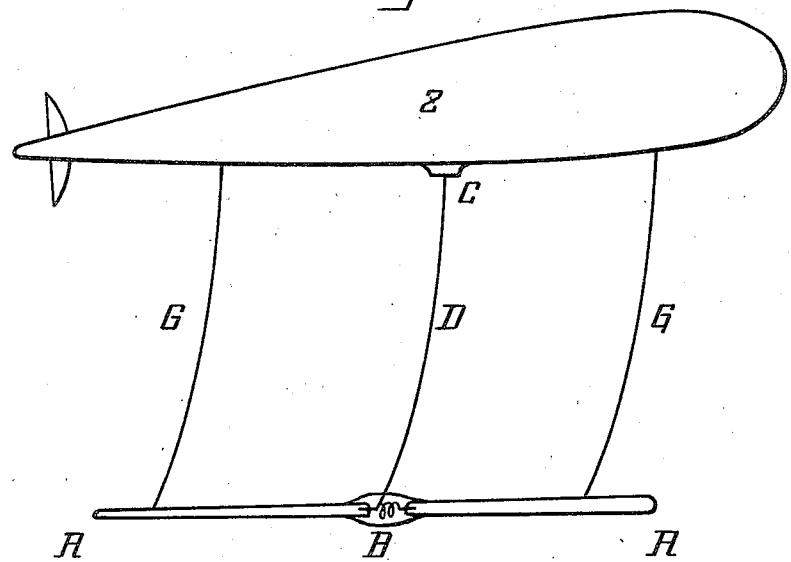
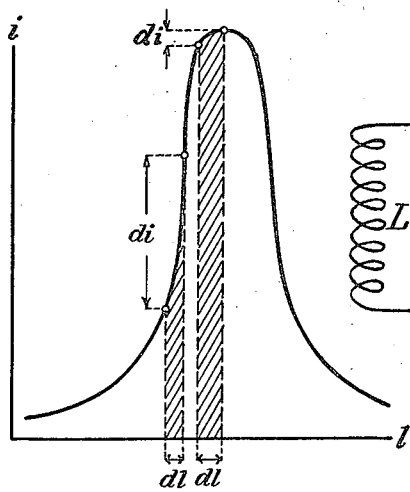
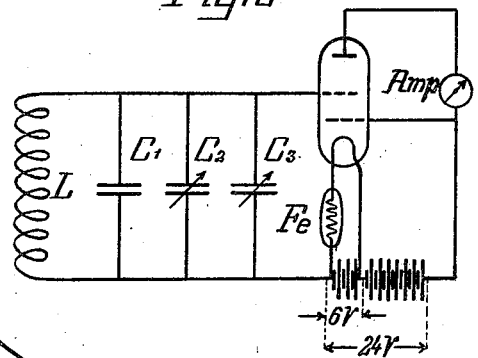
Inventor
H. Löwy
by Langner, Parry, Card & Langner
Att'ys.

Inventor
H. Löwy
by Langner, Parry, Card & Langner
Attys.

Patented Apr. 29, 1924.

1,492,300

UNITED STATES PATENT OFFICE.

HEINRICH LÖWY, OF VIENNA, AUSTRIA.

MEANS FOR ELECTROAVIATIC PROOF AND MEASURING OF THE DISTANCE OF ELECTRIC CONDUCTIVE BODIES.

Application filed July 17, 1923. Serial No. 652,199.

*To all whom it may concern:*

Be it known that HEINRICH LÖWY, residing at Vienna, VII Zieglergasse 1, Austria, has invented certain new and useful Improvements in Means for Electroaviatic Proof and Measuring of the Distance of Electric Conductive Bodies, of which the following is a specification.

Electric prospecting of the interior of the earth should preferably take place by means of an antenna carried by a flying machine, either an air ship or aeroplane, and the antenna could be dragged along the surface of the ground and the variations of the natural wave length of the antenna found which would form the means for determining whether electrically conducting bodies were being approached or whether the distance between these bodies and the machine was becoming greater. By dragging an antenna of a length of about 100 m. or more behind the machine, the friction between the antenna and the ground consumes a very considerable amount of energy and more especially as the velocity of the flight increases, and thus interferes with the security of the flight.

Another disadvantage due to resting the antenna on the ground is, that any moisture, or other electrically conductive material on the surface layers, even if very small, as small water pools, dampness of the air, or the like, has a relatively very great influence on the electric characteristics (capacity and damping) of the antenna. This proved a very disturbing factor in measurements which were recently made in an expedition in the Sinai Peninsula. At points near the sea, it was found that the capacity changed considerably from place to place due solely to the varying influences of the upper ground surface on the antenna, and that the effects of deeper parts of the earth, which were desired to be studied, were almost completely covered up.

This disadvantage is removed by carrying the antenna, above the earth, and at a suitable height. Another advantage, which is most important in practice, is also obtained, in that the exploration is not limited to areas which are substantially flat and which have practically no vegetation.

From the electrical standpoint, it is clearly possible to make the necessary measurements with an antenna which is at some distance from the earth, if the sensibility of the measuring means used, is sufficiently great. Experiments made with balloons and aeroplanes, with the assistance of the Zeppelin Company at Friedrichshafen, above Lake Bodensee, have clearly shown that the influence, upon the capacity of a horizontal antenna of electric conducting surfaces such as the surface of a lake, are very small if considered from a great height.

In order to measure such influences, it is necessary to use a wave measuring device, of greater sensibility than that of the standard types thus far used, and further, it is necessary to use some attachment for the antenna which renders the position of the antenna as stable as possible, relative to the machine, since small deformations of the antenna wire or small changes in its position relative to the machine, which might occur by chance, would cause changes in the capacity such as to cover up changes in capacity produced by changes in electrically conductive deposits adjacent the machine. Of course the antenna should be a sufficient distance from the mean earth surface, to overcome effects of topographical irregularities.

An arrangement according to the invention is shown by way of example in the accompanying drawings whereby to explain the invention more fully, and wherein;

Fig. 1 shows an airship which is fitted according to the present invention;

Figs. 2 and 4 show resonance curves of the apparatus;

Fig. 3 shows the arrangement of the wave measuring devices;

Figure 4:
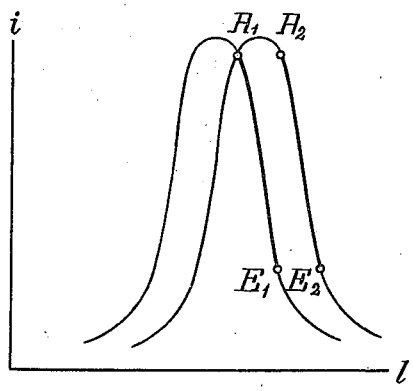

The arrangement consists of an electric oscillation circuit, the characteristics of which (capacity, damping etc.) are observed during the flight; and of a wave measuring device. The oscillation circuit must have an electro-magnetic leakage as great as possible, and therefore either a symmetric or an asymmetric antenna is used.

In Fig. 1 A—A is a symmetric antenna, attached to the carrying body Z, of an air machine, by suspension means G—G. The distance between the antenna and the carrying body is made as great as practicable, in order to render the influence of the carrying body upon the antenna (which is besides a constant influence) as small as possible. The antenna and its suspension means are made rigid so as to assure, so far as possible, a constant distance of the oscillation circuit from the carrying body, during the measuring operation. This suspension is only so resilient as to prevent injuries when inadvertently colliding with the earth. In calm weather any usual method of attaching the antenna can be employed in place of the said rigid suspension.

The wave measuring device used makes it possible to detect very small changes in wave length. It was impossible till now with the usual method of resonance, to measure the wave length. This usual method consists in ascertaining the maximum of the electric intensity of the current. In this maximum method, the measurement is less sensitive just at the critical point of the resonance curve, that is at the summit of the curve near the point of resonance. Clearly, the sensibility at the summit is smaller than to the left or to the right thereof. As may be seen from the resonance curve of Fig. 2, a given change in the wave length $dl$ is accompanied by a change in the current $di$, and this current change $di$, in the portions lying at a distance to the left and to the right of the summit of the curve, is very much greater than the corresponding change of the current, $di$, near the summit of the curve. In the present case the measurements are not for ascertaining the wave length itself, but for ascertaining the changes in the wave length and therefore the place of measurement is removed from the summit of the curve to the left or right thereof, depending on the special conditions. When making the measurements, the measuring circuit and the oscillation circuit of the variable wave length which is to be tested, are tuned for a given starting wave length and are tuned against each other, so as to shift the point of measurement into the more sensitive zone. By measurement, is ascertained, during the flight, the change of the intensity of the current, by means of an ammeter in the measuring circuit. For this method, the usual wave measuring devices, with contact detectors, cannot be used, because the present method requires a high sensibility, accompanied by freedom from change of the sensibility, due to outside disturbances (shakes or the like). To the different distances from the conductive surface, there are coordinated absolute values of the electric current and not maxima values as in the usual resonance method for ascertaining wave length. An increase of the constancy, but at the expense of sensibility, can be obtained by using thermo-elements instead of contact detectors. High constancy and high sensibility are both obtained, by using electron tubes as detectors.

Fig. 3 shows how the measuring device is electrically connected with the related parts L, $C_1$, $C_2$, and $C_3$ form an oscillating circuit. The rotary condenser $C_2$ is provided with a device $C_3$, for fine adjustment. A resistance, Fe, arranged in the circuit of the filament of the tube, assures the constancy of the filament current.

If the more sensitive portion of one resonance curve is insufficient for the total variation of the wave length, it is necessary to use two or more of the resonance curves (Fig. 4) for the purpose. It is hence, necessary to provide a device which may, if desired, act automatically, and by which the rotary condenser which serves for the regulation of the measuring circuit, can be intermittently shifted. By such shifting the dial index of the ammeter, which is in the measuring circuit, must be immediately moved to the starting point $A_2$ of the second resonance curve, as soon as the index has run through the sensitive portion of the first resonance curve from $A_1$ to $E_1$, and so forth.

Figure 5:
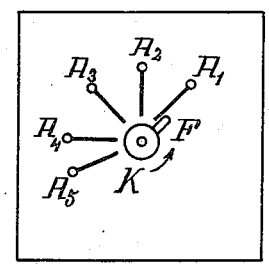
Fig. 5 shows, schematically, an arrangement for jumping from one resonance curve to another.

Such a device, for passing from one resonance curve to the other, is schematically shown in Fig. 5. K is a knob for the rotary condenser, seen from above. The knob carries an arm F which is normally biased by a spring in the direction of the arrow, and is pressed against the stop $A_1$. The spring, (not shown) acts directly or through gears, on the axis of the knob K. As soon as the index of the ammeter reaches the point which corresponds to the point $F_1$ of a resonance curve, (Fig. 4), the arm F is moved, either automatically, or by hand, by means of a knob and permits turning from $A_1$ to $A_2$ (Fig. 5) corresponding to the point $A_2$ of Fig. 4.

An analogous method for increasing the exactness of measurements according to the resonance method, can also be applied when ascertaining the wave length, by means of a beating receiver. The problem is to design a resonance curve, that is, to relate to certain changes in the wave length, the corresponding changes of the beating tune. This can be done, for instance, in such a manner that the sufficiently increased beating-current is brought to a tone frequency measuring device which permits of directly reading the pitch of the tone. Now it is possible, just as before, to carry on quantitative measurements not in the summit of the curve, but in the adjoining sensitive part of the curve.

The number of the resonance curves which is required for the measurements of the change of wave length of a given length can be computed as follows. The audible scope of tones, $dn$, amounts substantially to $dn=20000$ per sec. that is $$\left(\frac{1}{L_1}-\frac{1}{L_2}\right) \cdot C = 20000;$$

in which C is the velocity of light, and $L_1$ and $L_2$ are the lengths of the electric waves coordinated to the end points of the tune interval. If $L_1=300$ m., for instance, $L_2$ would equal 306 m. This shows that the sensitive scope of a resonance curve would correspond to a total change in the wave length of 6 m. For a change in the wave length of $dl=30$ m., we would therefore require approximately 5 resonance curves.

Figure 6:
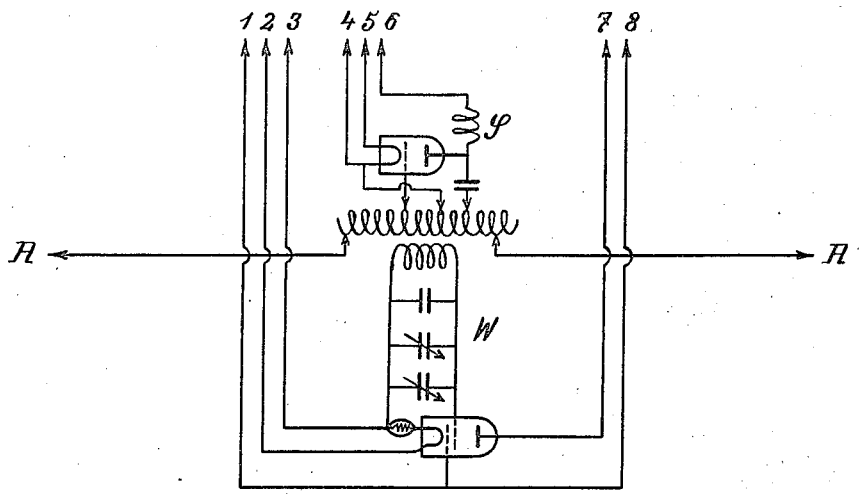
Fig. 6 shows, schematically, a complete assembly.

Fig. 6 shows the complete mounting. S is a primary transmitter for the excitation of electric oscillations in the antenna A—A of the Fig. 1. W is the wave measuring device of the Fig. 3. The complete apparatus is enclosed in a casing B (Fig. 1). Only the sources of E. M. F. and the ammeter of the wave measuring device, are located within the case C (Fig. 1) and are connected to the rest by wires D. Between 1 and 2 is located the anode battery, between 2 and 3 is the filament battery of the wave measuring device W (Fig. 6). Between 4 and 5 is located the filament battery and between 5 and 6 the anode battery of the transmitter S. Between 7 and 8 is the measuring instrument, that is, the ammeter of the wave measuring device W (Fig. 6). The main uses for which the described means can be used, are the following:

1. Electro-aviatic exploration of the interior of the earth in order to find ores, or to find ground water in arid regions and
2. Electro-aviatic measuring of the elevation of air, machines, flying in damp regions.

Having now described my invention, what I claim as new and wish to secure by Letters Patent is:—

1. A process for exploring for electrically conductive bodies, comprising, moving an antenna in a substantially horizontal plane above land to be explored, exciting natural electric vibrations in the antenna, and measuring the frequency variations produced in the vibrations by electrically conductive bodies.

2. A process for exploring for electrically conductive bodies, comprising, moving an antenna in a substantially horizontal plane, radiating electric waves from the antenna, and measuring the changes produced by electrically conductive bodies in the natural oscillation period of the antenna.

3. A process for exploring for electrically conductive bodies, comprising, moving an antenna in a substantially horizontal plane over and above land to be explored, radiating electric waves from the antenna while keeping the various constants of the radiating circuit fixed, and receiving the waves, and measuring the variations in their length, due to the presence of electrically conductive bodies.

4. A process according to claim 1, said horizontal plane being spaced at such a distance from the mean surface of the land, as is relatively large compared to the topographical irregularities of the land.

In testimony whereof I affix my signature in presence of two witnesses.

DR. HEINRICH LÖWY.

Witnesses:
 CARL COUDENBURG,
 WLADIMER P. TUNDOLF.